US012760995B2

(12) United States Patent
York et al.

(10) Patent No.: US 12,760,995 B2
(45) Date of Patent: Oct. 13, 2026

(54) METAL REINFORCED TARGET SIGHT

(71) Applicant: Sig Sauer, Inc., Newington, NH (US)

(72) Inventors: Andrew W. York, Portland, OR (US); Drew A. Essig, Portland, OR (US)

(73) Assignee: SIG SAUER, INC., Newington, NH (US)

( * ) Notice: Subject to any disclaimer, the term of this patent is extended or adjusted under 35 U.S.C. 154(b) by 18 days.

(21) Appl. No.: 18/801,262

(22) Filed: Aug. 12, 2024

(65) Prior Publication Data

US 2025/0052537 A1 Feb. 13, 2025

Related U.S. Application Data

(60) Provisional application No. 63/532,333, filed on Aug. 11, 2023.

(51) Int. Cl.

| | |
|---|---|
| ***F41G 1/30*** | (2006.01) |
| ***B29C 45/00*** | (2006.01) |
| ***B29C 45/14*** | (2006.01) |
| *B29K 77/00* | (2006.01) |

(52) U.S. Cl.

CPC ............ *F41G 1/30* (2013.01); *B29C 45/0001* (2013.01); *B29C 45/14311* (2013.01); *B29K 2077/00* (2013.01)

(58) Field of Classification Search

CPC . F41G 1/30; B29C 45/0001; B29C 45/14311; B29K 2077/00

USPC .......................................................... 42/113

See application file for complete search history.

(56) References Cited

U.S. PATENT DOCUMENTS

| | | | | |
|---|---|---|---|---|
| 3,311,690 | A * | 3/1967 | Fischer | B29C 45/14073 425/577 |
| 5,168,108 | A * | 12/1992 | Chacko | C08L 77/00 524/538 |
| 9,464,869 | B1 * | 10/2016 | LoRocco | F41G 1/467 |
| 2015/0377578 | A1 * | 12/2015 | Tucker | F41A 23/18 248/316.1 |
| 2018/0009032 | A1 * | 1/2018 | Kelkar | B22F 3/1021 |
| 2023/0175817 | A1 | 6/2023 | Boudreau | |
| 2023/0204324 | A1 | 6/2023 | Boudreau et al. | |
| 2023/0411763 | A1 * | 12/2023 | Sheets, Jr. | H01M 50/284 |

OTHER PUBLICATIONS

International Search Report and Written Opinion of the International Searching Authority issued in International Application No. PCT/US2024/041974, mailed Nov. 11, 2024, 14 pages.

* cited by examiner

*Primary Examiner* — Samir Abdosh
(74) *Attorney, Agent, or Firm* — Miller Nash LLP

(57) ABSTRACT

A method for forming a base housing of a targeting sight for a firearm includes placing one or more metal components into an injection mold, injecting material in liquid form into the injection mold to contact the one or more metal components, curing the material injected into the injection mold, and removing the cured material from the injection mold. A target sight having a base housing including a metal frame and non-metallic material formed surrounding the metal frame is also described.

17 Claims, 5 Drawing Sheets

METAL REINFORCED TARGET SIGHT

CROSS-REFERENCE TO RELATED APPLICATIONS

This application is a non-provisional of and claims benefit from U.S. Provisional Patent Application No. 63/532,333, titled METAL REINFORCED TARGET SIGHT, filed Aug. 11, 2023, the contents of which are incorporated by reference in their entirety.

TECHNICAL FIELD

This disclosure is directed to firearm accessories, and, more particularly, to target sights.

BACKGROUND

Optical sights, such as reflex or red-dot sights, provide a shooter with a quick and easy way to sight a target compared to conventional iron sights. Reflex sights are optical sights that include a reflecting element on which an aiming light or target is projected. An LED or other light emitter is commonly used as the light source. When the emitter generates its light signal, the projected light reflects from the reflecting element, such as a lens, coating, or other optic, and the reflection is seen by the shooter as being superimposed on the target or field of view. This reflection is referred to as a Point of Aim (PoA). In operation, the shooter then aligns the target to the PoA to accurately aim the firearm at the target.

DESCRIPTION

Embodiments of the disclosure are directed to a target sight formed of a polymer, such as nylon, reinforced with metal components. More particularly, embodiments are directed to a target sight having metal inserts molded into a polymer-based body and a method of manufacturing such a target sight.

Figure 1A:
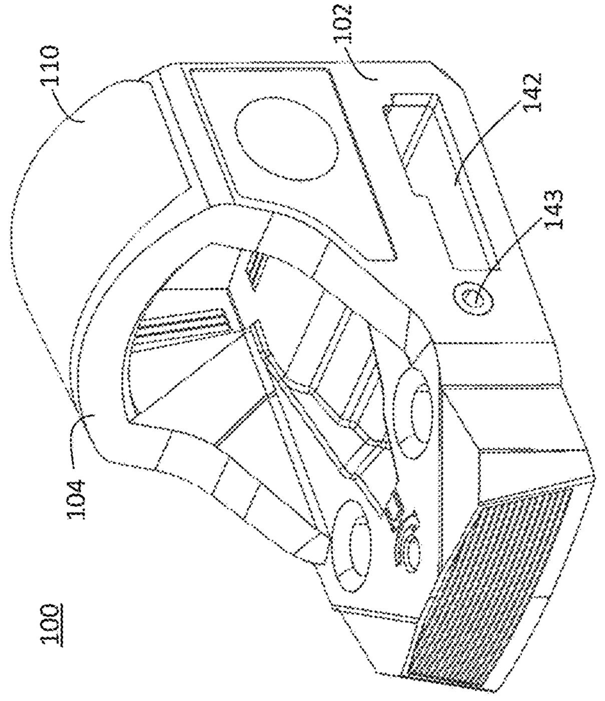
FIGS. 1A, 1B, 1C, and 1D illustrate perspective, top, front, and side views of a metal reinforced target sight, according to embodiments of the disclosure.

FIGS. 1A-1D show perspective, top, front, and side views, respectively, of a target sight 100 having housing components reinforced with metal, according to an embodiment. In particular, in the embodiment illustrated in FIGS. 1A-1D, a target sight housing or base 102 has a hooded portion 104 that may frame a lens of the target sight. As shown in FIG. 1A, this hooded portion 104 may have a top, curved surface 110 formed of metal. Forming the surface 110 from metal provides physical protection to the target sight 100, such as when being bumped, hit, or dropped.

Figure 1B:
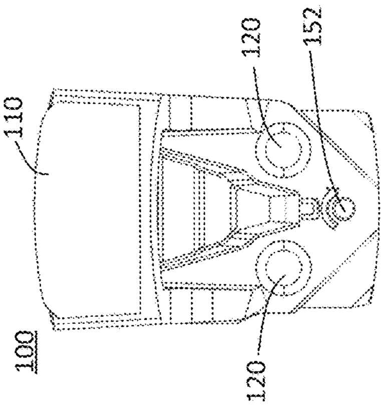

The target sight housing 102 may also include mounting apertures 120 through a top portion of the housing. Such mounting apertures 120 are best shown in FIG. 1B, and the mounting apertures may receive screws for mounting the target sight 100 to a mounting plate on the firearm. The apertures 120 may be formed of metal sleeves held in place by surrounding base material for the target sight housing. Or, as described in embodiments set forth below, the metal sleeves may be mounted into a metal frame coupled to the metal forming the surface 110. Forming the apertures 120 from metal allows them to withstand higher compression force than if they were formed of a nylon base material, providing a more secure mounting system for the target sight to the firearm.

Figure 1C:
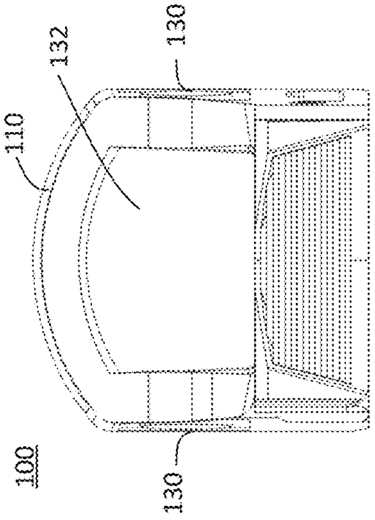

The target sight 100 may also include a front leading edge 130, best illustrated in FIG. 1C, to provide structural bracing additional components. The front leading edge 130 may be formed of plastic or nylon base material, or as described below, may be formed of metal. Finally, the target sight housing 102 may also include various apertures 140, 142, 152, and 154 positioned on a side and top of the sight housing. These apertures 140, 142, 152, and 154 may be used to receive, support, maintain, and hold various components typically used in target sights, as described in detail below.

Figure 1D:
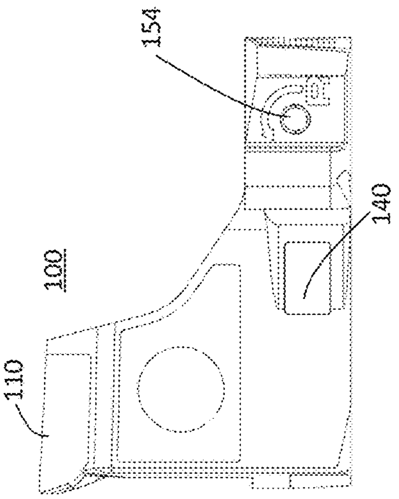

Aperture 140, best seen in FIG. 1D, may receive and support a control button (not illustrated) to control an on/off and brightness function of the target sight. In other embodiments multiple buttons may be used to control these functions, in which case the target sight housing 102 is designed having multiple control apertures to receive the multiple buttons.

Aperture 142 is sized and shaped to receive a battery or battery tray (neither illustrated), that may be used to power the sight 100. Further, aperture 143 be sized, shaped, and located to receive a screw holding a battery door (not illustrated) which keeps the battery or battery tray within the sight 100 after assembly.

Other apertures 152, 154 may be sized, structured, and located to receive screws for manual adjustment of the target sight position. More specifically, the aperture 152 may receive a slide screw that allows for a user to adjust targeted elevation of the target sight when mounted to the firearm, while the aperture 154 may receive a slide screw that controls windage correction, allowing the user to adjust the target left and right with respect to the user's viewpoint looking through the lens of the target sight 100.

In the embodiment illustrated in FIGS. 1A-1D, particular components of the target sight housing may be manufactured or formed from metal, while the remaining portions may be manufactured from a polymer material. The manufacturing process described below produces a metal-reinforced housing for a target sight. The metal is preferably stainless steel, although other metal materials may be used, such as regular steel, nickel, tin, aluminum, copper, titanium, or alloys thereof. First, the hooded portion 110 framing the lens of the target sight shown in FIG. 1A may be metal. More specifically, the hooded portion 110 may be made of a metal insert that follows the curve of the housing. Reinforcing the hooded portion that frames a lens 132 in this way makes the lens less vulnerable to damage from the firearm being dropped or otherwise experiencing a shock. As described above, the front leading edges 130 may also be formed from metal, providing further shock protection to the target sight housing and allowing for racking of additional components to the target sight. The process for forming the mixed polymer-metal target sight is described below.

The metal reinforced target sight described above may be manufactured via an overmolding process, in embodiments. The first step in this process, according to an embodiment, is to manufacture the metal inserts. For instance, standard machining techniques may be used to form the curved top plate for the hooded portion 110 of the sight housing, the inserts 120 for the mounting screw apertures and slide screw apertures 140, and the plate forming the leading edge 130. Although each of these metal components may be manufactured independently, in other embodiments, described below, one or more of the metal components may be assembled into a unitary frame structure. In other embodiments one or more metal components may be assembled into a frame structure, while still other metal components may remain separate, and not assembled into a frame structure.

Once the metal components or inserts are formed, they may be deposited or otherwise placed into an injection mold to be either partially or fully encapsulated by an injected polymer. In this way, the mold may be formed corresponding to the target sight housing as a whole, and the metal inserts may be placed into the mold at the positions where reinforcement is desired. Then, the injected polymer fills the remaining volume of the mold and cures to a solid form. Once cured, the target sight housing may be removed from the mold as a single part that includes both metal and polymer components. In other embodiments the polymer material may be removed from the mold before it is fully cured, and allowed to cure outside of the mold.

In embodiments of the disclosure, the metal inserts may be manufactured from stainless steel or aluminum, although other metals may be appropriate for the reinforcement described herein. Additionally, the polymer material used for injection molding may be nylon or glass-reinforced nylon, although other polymers known to be used in injected molding processes that may interface with the disclosed metal inserts may be used.

Figure 2A:
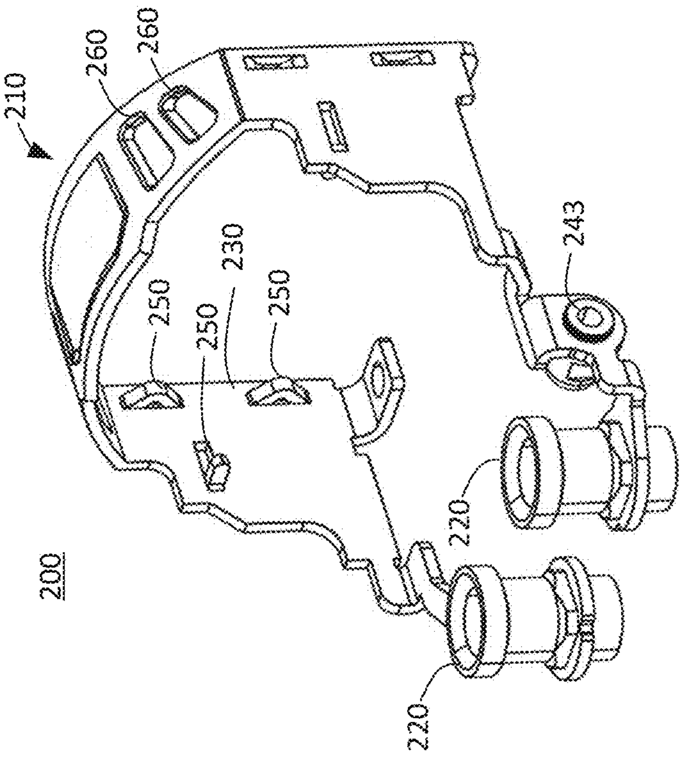
FIGS. 2A and 2B are perspective views of a metal frame used in creating a metal reinforced sight housing according to embodiments of the disclosure.
Figure 2B:
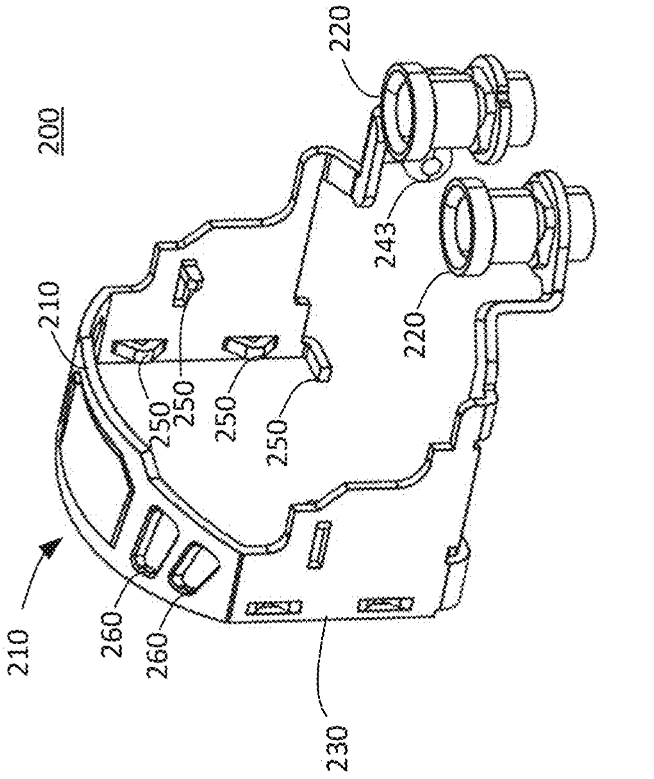

FIGS. 2A and 2B are perspective views of a metal frame used in creating a metal reinforced sight housing according to other embodiments of the disclosure. Description that is common between the embodiments illustrated above and those illustrated in FIGS. 2A, 2B, 3, and 5 is omitted for brevity, and is not repeated. A metal frame 200 integrates many of the individual parts that were described above. Using an assembled frame, such as the metal frame 200, in the manufacturing process may provide increased manufacturing tolerances over inserting multiple elements into the mold prior to production, since the frame tends to hold the components in place during the injection mold process. Also, as described below, it is not necessary that all metal components that will be formed during the injection process need to be attached to the metal frame 200, and the designer is free to incorporate specific pieces, or not, depending on implementation details. Using an assembled frame, such as the metal frame 200, also speeds production time as fewer parts need to be inserted into the mold prior to injection.

With reference to FIGS. 2A and 2B, a metal frame 200 integrates multiple sections that were described as individual pieces in the embodiment described with reference to FIGS. 1A-1D. The metal frame 200 generally includes a curved portion 210 that is formed to produce the curved shape of the front of the overall target sight, which corresponds to the hooded portion 110 in the embodiment described above. The frame 200 also includes a leading edge section 230, which corresponds to the front leading edge 130 described above. As can be seen, in the embodiment illustrated in FIGS. 2A and 2B, the metal frame 200 integrates multiple sections that were described as individual pieces in the embodiment described with reference to FIGS. 1A-1D.

One or more inserts or sleeves 220 may be integrated into the metal frame 200. Or, as in the illustrated embodiment, the sleeves 220 may be formed separately from the metal frame 200 and later attached to or inserted into pre-formed apertures within the metal frame. In one embodiment the sleeves 220 are formed from turned aluminum or produced using Computer Numerical Control (CNC) manufacturing processes that are well known. The sleeves 220 may be press fit into corresponding apertures (not illustrated) in the metal frame 200 so that they are securely held. In other embodiments the sleeves 220 may be threaded inserts or otherwise secured to the metal frame 200 prior to the frame being inserted into an injection mold. Similarly, a threaded insert 243 may be assembled into the metal frame 200 as part of the frame assembly process. In the illustrated embodiment, the threaded insert 243 is used to later receive a screw that holds a battery cover in place.

The metal frame 200 may optionally include one or more stabilizers 250 to help prevent the frame from shifting during the injection molding process. Depending on the particular injecting process, the one or more stabilizers 250 may not be necessary, and may be omitted.

One or more apertures 260 may also be formed through the metal frame 200 that allow part of the molten material used in the injection process to flow through the metal frame. After curing, the material that flowed through the one or more apertures may tend to tightly secure the metal frame 200 to the base material used for injection. In other embodiments, since the material that flowed through the apertures 260 may be visible in the final product, the one or more apertures 260 may be used for purely cosmetic purposes to create a design pattern as part of the final device. In some embodiments the one or more apertures 260 may be used for both securing and design purposes.

In some embodiments the metal frame 200 may be initially formed of punched or cut sheet metal where the cuts or punches define the outside shape of the frame. Apertures, such as those described above, may be formed with the same punching or cutting action that creates the outside shape, or may be formed after the initial shape is formed. Next the cut or punched metal is placed in a forming jig and bent to create the various surfaces, such as illustrated in FIGS. 2A and 2B. The curved portion 210 may be formed around an appropriately curved portion of the jig to produce the curved shapes. Various tabs and other bends are produced using the jig or other known processes. Different jigs may be used for the various bending and shaping processes. The stabilizers 250 may be formed at any time during the process, either during the initial cutting or punching, or during a subsequent process. Finally, components such as the sleeves 220 and insert 243 may be attached to the metal frame 200 as described above. Although the sleeves After the metal frame 200 is manufactured and assembled, it may be placed in the injection mold as part of the injection processing.

Figure 3:
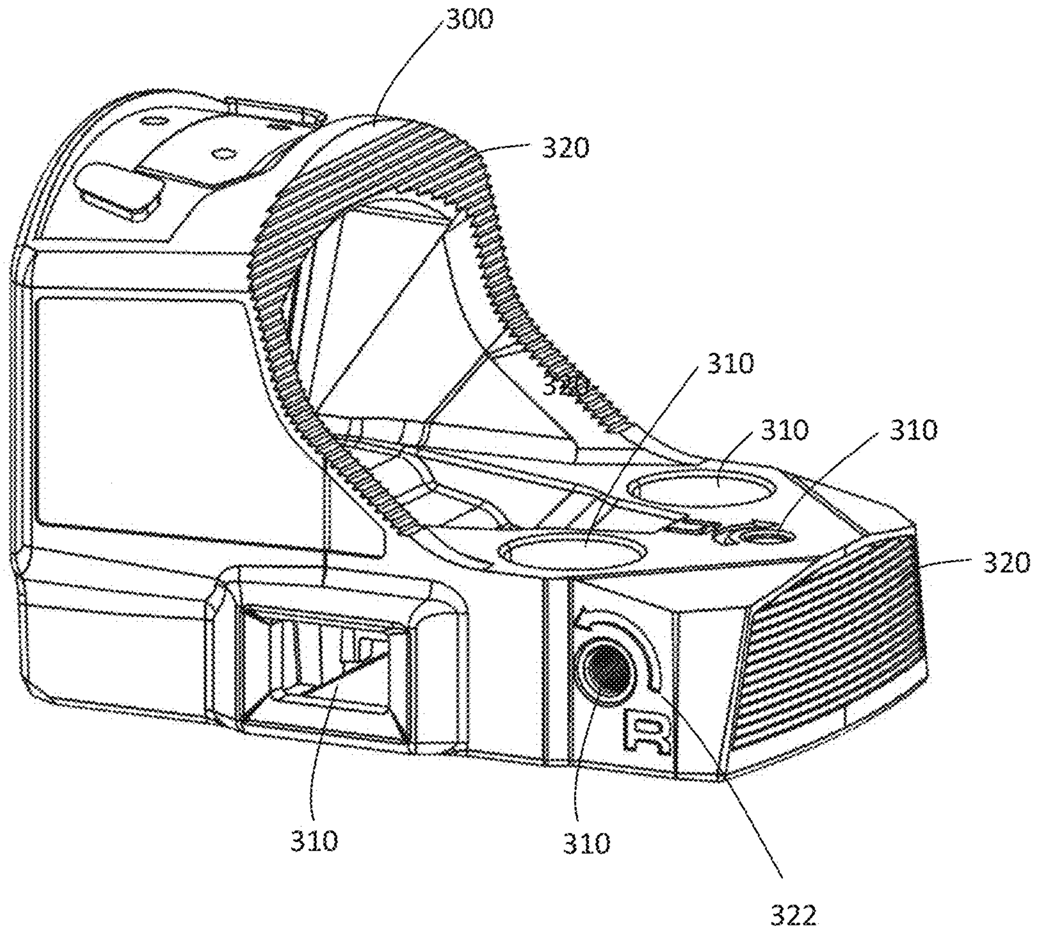
FIG. 3 is a perspective view of plastic or other physical pattern that may be used in forming a housing mold, according to embodiments of the disclosure.

FIG. 3 is a perspective view of a physical pattern 300 that may be used to form an injection mold for the housing, according to embodiments of the disclosure. As is known, an injection mold is a form of a negative mold, so that after the molded material has been injected and cured, the final product takes a positive shape. Negative molds may be created directly, such as by CNC processes formed in the mold material, or they may be formed based on a positive physical pattern, such as the pattern 300 illustrated in FIG. 3. When based on a positive physical pattern, as a first step, the physical pattern is created, such as the pattern 300. The pattern 300 is generally shaped to resemble the desired final product, including the multiple apertures 310 as described above. The positive pattern may be formed of any material and does not necessarily need to be made from the same material used during the injection process. Decorative elements such as the lines 320 may be produced in the pattern 300. Also, other features that a user will see may be formed in the positive pattern, such as the direction indicator 322 formed in the pattern 300, which informs the user a windage adjustment direction. Once the pattern has been created, known techniques are used to create a negative injection mold (not illustrated) from the positive pattern. Molds may be created in two or more pieces that may be separated after injection to remove the final product. Once created, negative injection molds may be repeatedly used to create multiple copies of the final product by opening the mold, retrieving a product, then reassembling the mold for subsequent use. Sometimes substances such as release sprays are used as part of the injection molding process to facilitate removing the molded product.

Figure 4:
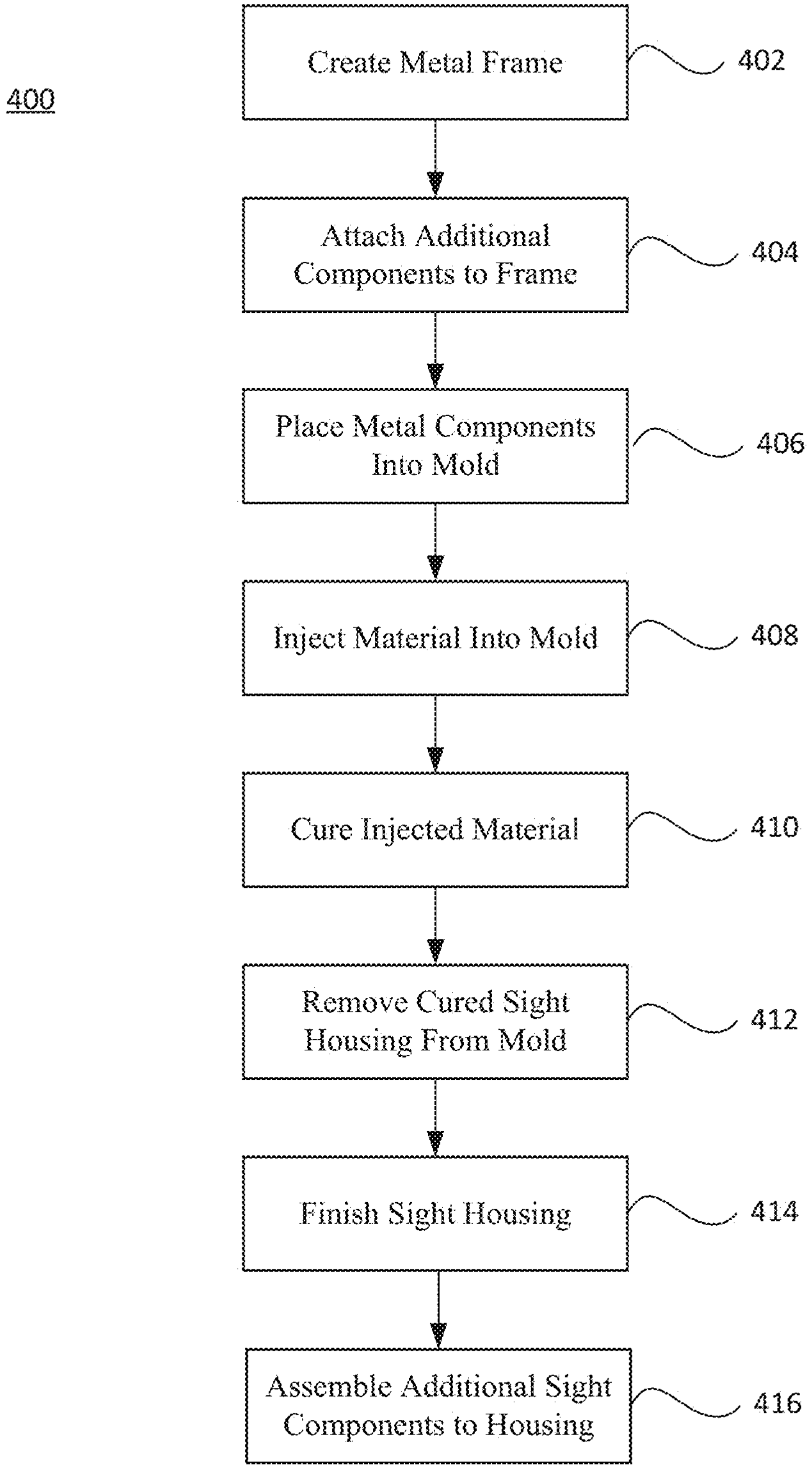
FIG. 4 is an example flow chart describing operations used to make a co-molded sight housing according to embodiments of the disclosure.

FIG. 4 is a flow chart describing a flow 400 of example operations that may be used to make a co-molded sight according to embodiments of the disclosure. The flow 400 begins at an operation 402, where a metal frame is created. As described above, the metal frame, such as metal frame 200, may be initially formed from flat metal, cut or punched, and then bent into shape using one or more jigs.

Additional components such as the sleeves 220 and insert 243 may be attached to the metal frame 200 as described above in an operation 404. Next, the assembled frame and any other components desired to be integrated into the housing may be placed into the mold in an operation 406. The frame and/or other components may be attached or otherwise secured to the mold to prevent shifting during the molding process.

It should be noted that, although convenient, it is not necessary that a frame, such as the metal frame 200, be created and have additional components attached to it prior to inserting the frame into the mold. For instance, the embodiment described above with reference to FIGS. 1A-1D has no frame, and instead individual components are inserted into the mold in the operation 406. In such embodiments operations 402 and 404 may be omitted. Alternatively, using an assembled metal frame, such as the metal frame 200, as part of the production process may speed up production time and may retain various components in place during the injection process. The completed metal frame 200 may incorporate or be fastened to any number of components that will ultimately be inserted into the mold.

Operation 408 injects material into the mold that also contains the metal parts introduced in operation 406, co-forming a product that includes metal parts as well as injected material. In operation, the injected material is injected into the mold at sufficiently high pressures to contact and partially or fully encapsulate the metal components during the injection process. As described above, the injected material may be a polymer material such as glass-filled nylon. Other possible materials used for injection may include acrylic, polycarbonate, polypropylene, polyoxymethylene, polyamide, and thermoplastic polyurethane, for example.

After injection, the injected material is cured in an operation 410, and the metal-reinforced sight housing may be removed from the mold in an operation 412. As described above, the order of these operations 410, 412, may be reversed and the sight housing be allowed to cure, or fully cure, after being removed from the mold. Curing the injected material may include exposing the injected material to elevated temperatures or using other known methods.

Next, after being removed from the mold in operation 412, any post-molding processes may be performed in operation 414. Such processes may include trimming of material access ports, as well as shaping, grinding, and polishing the sight housing, for example.

Finally, after the metal-reinforced sight housing has been produced using the above-described operations, remaining components of the metal-reinforced sight may be assembled and tested, as described below.

Figure 5B:
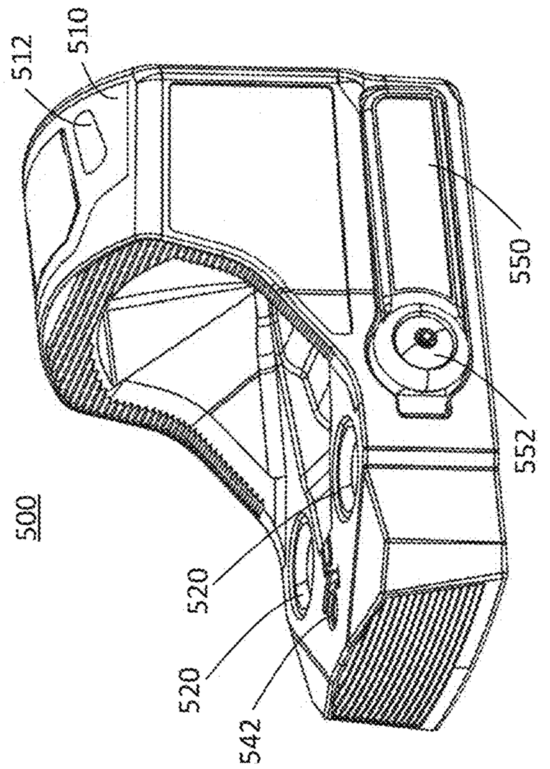
FIGS. 5A and 5B are perspective views of a completed sight having a metal reinforced housing according to embodiments of the disclosure.
Figure 5A:
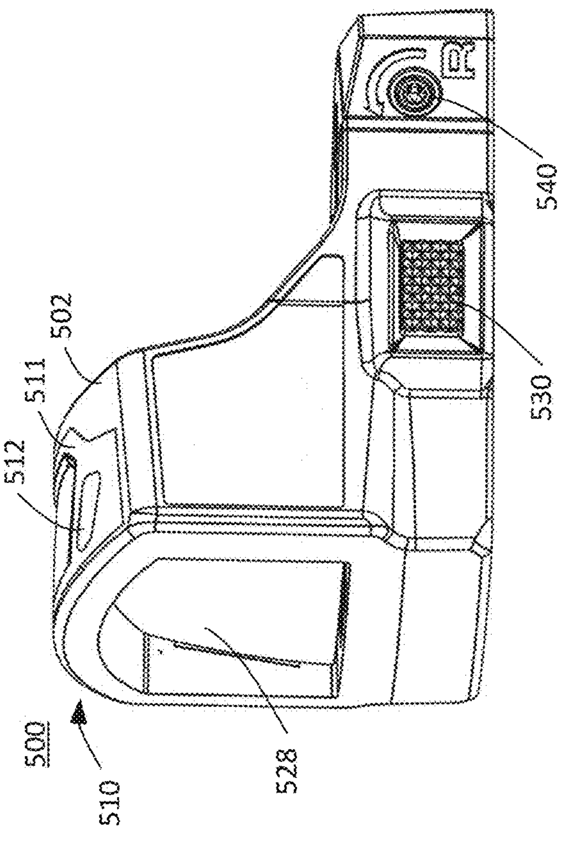

FIGS. 5A and 5B are perspective views of a completed sight 500 having a metal reinforced housing 502 according to embodiments of the disclosure. In general, after the metal reinforced housing 502 has been produced, as described above, various components are assembled into the housing to produce the completed sight 500. The metal reinforced housing 502 includes a hood portion 508 formed of a combination of a metal portion 511 as well as base material portion 512. In the illustrated embodiment the metal that forms the metal portion 510 of the hood portion 508 is visible to the user as a metal surface. In other embodiments the injection material can entirely cover the metal hood portion 510 so that only the injected material is visible. In some embodiments the base material portion 512 has been injected through, for example the apertures 260 of the metal frame 200 (FIG. 2) and contributes to maintaining the metal portion 511 integral to the completed sight 500.

The hood portion 510 covers a lens 528 through which the shooter views the target as well as a point of aim. Sleeves 520, which, as described above may be formed of metal, provide apertures for attachment screws. The completed sight 500 may be attached to a firearm by tightening screws through the sleeves 520 into the firearm.

A control button 530 is inserted into an aperture that was formed in the metal reinforced housing 502 during the production process, such as one of the apertures 310 in FIG. 3. The control button 530 allows the shooter to control a brightness function of the completed sight 500 as well as controlling an on-off function. Adjustment screws 540, 542 allow the user to control a position of the point of aim relative to the target, as described above. Recall that the adjustment screws 540, 542 are received in metal receivers that were placed in the mold prior to the injection process. Including the metal receivers provides additional strength over what the injected material can provide were the sleeves not used. Including the receivers or not is an implementation decision and the metal receivers or inserts need not be present in all embodiments. A battery door 550 covers a battery or battery tray, which is secured by a screw 552. In this particular embodiment the screw 552 is received by threaded insert 243 described above with reference to FIG. 2.

Not visible in a sight such as the completed sight 500 are the electronic components that provide the electronic function for the sight. Such components include a main circuit board that supports a processor or microcontroller, both generically referred to as a processor. The processor is powered by a power source, such as a battery. An emitter is controlled by the processor to produce the point of aim illumination for the shooter. Typically, the emitter is formed of an LED or array of LEDs. The processor controls the on/off and brightness operation of the emitter controlled by the shooter operating user inputs. The user inputs are generally physical buttons as described above, but these functions may also be controlled in other ways, such as by an application running on a portable device that is in communication with the processor, such as through a wireless connection.

The contents of the present document have been presented for purposes of illustration and description, but such contents are not intended to be exhaustive or limited to the disclosure in the form disclosed. Many modifications and variations will be apparent to those of ordinary skill in the art without departing from the scope and spirit of the disclosure. The aspects of the disclosure in this document were chosen and described to explain the principles of the disclosure and the practical application, and to enable others of ordinary skill in the art to understand the disclosure with various modifications as are suited to the particular use contemplated.

The previously described versions of the disclosed subject matter have many advantages that were either described or would be apparent to a person of ordinary skill. Even so, all of these advantages or features are not required in all versions of the disclosed apparatus, systems, or methods. All features disclosed in the specification, and all the steps in any method or process disclosed, may be combined in any combination, except combinations where at least some of such features and/or steps are mutually exclusive. Each feature disclosed can be replaced by alternative features serving the same, equivalent, or similar purpose, unless expressly stated otherwise.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Accordingly, it is to be understood that the disclosure in this specification includes all possible combinations of the particular features referred to in this specification. For example, where a particular feature is disclosed in the context of a particular example configuration, that feature can also be used, to the extent possible, in the context of other example configurations.

It is understood that the present subject matter may be embodied in many different forms and should not be construed as being limited to the example configurations set forth in this specification. Rather, these example configurations are provided so that this subject matter will be thorough and complete and will convey the disclosure to those skilled in the art. Indeed, the subject matter is intended to cover alternatives, modifications, and equivalents of these example configurations, which are included within the scope and spirit of the subject matter set forth in this disclosure. Furthermore, in the detailed description of the present subject matter, specific details are set forth to provide a thorough understanding of the present subject matter. It will be clear to those of ordinary skill in the art, however, that the present subject matter may be practiced without such specific details.

The foregoing detailed description has been presented for the purposes of illustration and description. It is not intended to be exhaustive or to limit the invention to the particular disclosed embodiments. Numerous variations and configurations will be apparent in light of this disclosure. Thus, it is intended that the scope of the invention be defined not by this detailed description, but rather by the claims appended hereto.

What is claimed is:

1. A method for forming a targeting sight for a firearm, the method comprising:
- placing one or more metal components into an injection mold;
- injecting material in liquid form into the injection mold to partially or fully encapsulate the one or more metal components;
- curing the material injected into the injection mold; and
- removing the cured material and the encapsulated one or more metal components from the injection mold as a single unit; and
- finishing the single unit into the targeting sight.

2. The method according to claim 1, in which curing the material injected into the injection mold precedes removing the cured material from the injection mold.

3. The method according to claim 1, wherein the single unit is a base or housing of the targeting sight, and further comprising:
- attaching a light emitter to the single unit; and
- attaching a microcontroller to the single unit, the microcontroller configured to control the light emitter.

4. The method according to claim 1, in which the injectable material is glass-filed nylon.

5. The method according to claim 1, in which at least one of the one or more metal components comprises stainless steel.

6. The method according to claim 1, in which the one or more metal components comprise a metal frame.

7. The method according to claim 6, further comprising attaching at least one sleeve to the metal frame.

8. The method according to claim 7, in which attaching at least one sleeve to the metal frame comprises press fitting the at least one sleeve into an aperture within the metal frame.

9. A method for forming a targeting sight for a firearm, the method comprising:
- placing a metal component into an injection mold;
- injecting material in liquid form into the injection mold to partially or fully encapsulate the metal component;
- curing the material injected into the injection mold;
- removing the cured material and the encapsulated metal component from the injection mold as a single unit; and
- attaching at least one threaded receiver to the metal component.

10. The method according to claim 1, in which the one or more metal components comprise at least one metal frame and at least one additional metal component.

11. The method according to claim 9, in which curing the material injected into the injection mold precedes removing the cured material from the injection mold.

12. The method according to claim 9, wherein the single unit is a base or housing of the targeting sight, and further comprising:
- attaching a light emitter to the single unit; and
- attaching a microcontroller to the single unit, the microcontroller configured to control the light emitter.

13. The method according to claim 9, in which the injectable material is glass-filed nylon.

14. The method according to claim 9, in which the metal component is made of stainless steel.

15. The method according to claim 9, in which the metal component comprises a metal frame.

16. The method according to claim 15, further comprising attaching at least one sleeve to the metal frame.

17. The method according to claim 16, in which attaching at least one sleeve to the metal frame comprises press fitting the at least one sleeve into an aperture in the metal frame.

* * * * *